(12) United States Patent
Sekino et al.

(10) Patent No.: US 8,258,652 B2
(45) Date of Patent: Sep. 4, 2012

(54) POWER TRANSMISSION DEVICE

(75) Inventors: Shigeo Sekino, Higashiyamato (JP); Kaoru Someya, Kiyose (JP)

(73) Assignee: Casio Computer Co., Ltd, Tokyo (JP)

( * ) Notice: Subject to any disclaimer, the term of this patent is extended or adjusted under 35 U.S.C. 154(b) by 184 days.

(21) Appl. No.: 12/618,888

(22) Filed: Nov. 16, 2009

(65) Prior Publication Data

US 2010/0133917 A1    Jun. 3, 2010

(30) Foreign Application Priority Data

Dec. 2, 2008 (JP) ................................ 2008-307087

(51) Int. Cl.
H01F 27/42 (2006.01)
(52) U.S. Cl. ........ 307/104; 307/149; 307/151; 320/108; 363/17; 363/21.02
(58) Field of Classification Search ................... 307/104, 307/149–151; 320/108; 363/21.02, 17
See application file for complete search history.

(56) References Cited

U.S. PATENT DOCUMENTS

| 7,310,245 B2* | 12/2007 | Ohbo | ........................ 363/21.02 |
| 2008/0231120 A1* | 9/2008 | Jin | ............................... 307/104 |
| 2009/0009006 A1* | 1/2009 | Jin et al. | ........................ 307/104 |
| 2009/0026844 A1* | 1/2009 | Iisaka et al. | ................... 307/104 |

FOREIGN PATENT DOCUMENTS

| JP | 2000-134830 A | 5/2000 |
| JP | 2006-074848 A | 3/2006 |

* cited by examiner

Primary Examiner — Jared Fureman
Assistant Examiner — Alfonso Perez Borroto
(74) Attorney, Agent, or Firm — Holtz, Holtz, Goodman & Chick, PC (57) ABSTRACT

A power transmission device includes: a power transmission coil to transmit electric power to a power receiving coil by an electromagnetic induction method; a driving unit to supply a driving voltage to the power transmission coil; a detection unit to detect an electric current flowing in the power transmission coil based on the driving voltage; a control unit to change an amplitude of the driving voltage; a starting point detection unit to detect the amplitude of the driving voltage as a characteristic point at which an electric current starts to flow in the power receiving coil, on a characteristic line representing a relationship between the driving voltage supplied to the power transmission coil and the electric current detected by the detection unit; and a transmission stopping control unit to stop power transmission by the power transmission coil if the characteristic point is not detected by the starting point detection unit.

1 Claim, 5 Drawing Sheets

POWER TRANSMISSION DEVICE

CROSS-REFERENCE TO RELATED APPLICATIONS

This application is based upon and claims benefit of priority from the prior Japanese Patent Application No. 2008-307087, filed on Dec. 2, 2008, and the entire contents of which are incorporated herein by reference.

BACKGROUND OF THE INVENTION

1. Field of the Invention

The present invention relates to a power transmission device that transmits electric power to a power receiving device by an electromagnetic induction method.

2. Description of Related Art

A power transmission device that transmits electric power to a secondary device in a non-contact manner by an electromagnetic induction method is already known.

In the power transmission device, when power transmission is started under the condition that a metallic foreign material is present, the transmitted electric power is absorbed by the metallic foreign material, which causes abnormal heating.

Therefore, in a technique for transmitting a certain amount of electric power, for example, a primary device and a secondary device each additionally includes a unit for sending and receiving signals between the primary device and the secondary device, and is configured to perform power transmission after determining whether or not the destination device is a normal device for power transmission.

For example, Japanese Patent Laid-Open No. 2006-74848 discloses technology in which a secondary unit that receives an electric power and a primary unit that transmits an electric power are each provided with an electromagnetic coupling coil for signal transmission. According to this technology, a signal that indicates that electric power is being received or for stabilizing a current and a voltage is fed back from the secondary unit to the primary unit at the time of power transmission.

Further, Japanese Patent Laid-Open No. 2000-134830 discloses a configuration in which a load sensor is provided in an electromagnetic induction power supply apparatus. According to this configuration, the load sensor can distinguish between a secondary power supply apparatus and a metallic foreign material, to thereby prevent abnormal heating due to the proximity of a metallic foreign material.

In order to send and receive signals between a primary device and a secondary device, a circuit configuration of each device is complicated. For example, in addition to a coil for power transmission, it is necessary to provide a coil or a circuit for sending and receiving signals.

Further, because it is necessary to provide each of the primary device and secondary device with a corresponding circuit or coil for sending and receiving signals, it is difficult to employ a power transmission device for transmitting electric power to a general power receiving device.

SUMMARY OF THE INVENTION

It is, therefore, a main object of the present invention to provide a power transmission device that can determine whether or riot electric power is being transmitted to a power receiving device only by control operations in the power transmission device.

According to one aspect of the present invention, there is provided a power transmission device, including: a power transmission coil to transmit electric power to a power receiving coil by an electromagnetic induction method; a driving unit to supply a driving voltage to the power transmission coil; a detection unit to detect an electric current flowing in the power transmission coil based on the driving voltage supplied by the driving unit; a control unit to change an amplitude of the driving voltage supplied by the driving unit; a starting point detection unit to detect the amplitude of the driving voltage as a characteristic point at which an electric current starts to flow in the power receiving coil, on a characteristic line representing a relationship between the driving voltage supplied to the power transmission coil and the electric current detected by the detection unit; and a transmission stopping control unit to stop power transmission by the power transmission coil if the characteristic point is not detected by the starting point detection unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An embodiment of the present invention will be described below with reference to the drawings.

Figure 1:
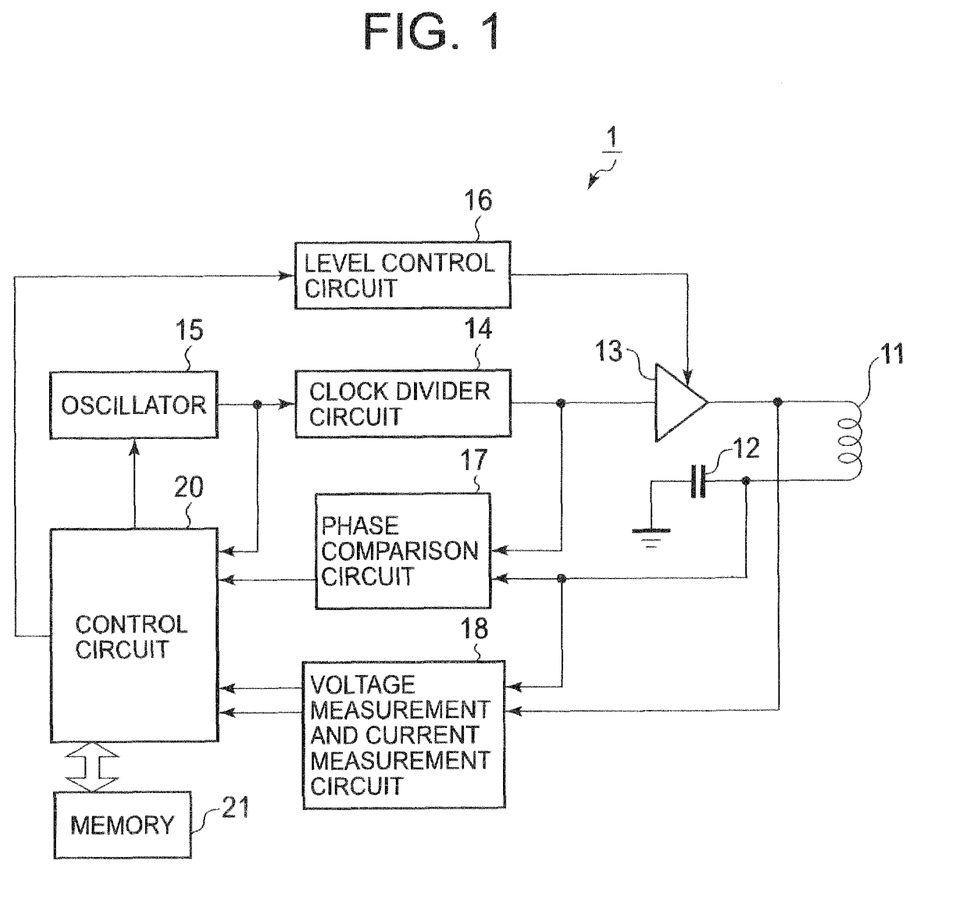
FIG. 1 is a block diagram showing a circuit configuration of a power transmission device according to an embodiment of the present invention.
Figure 2:
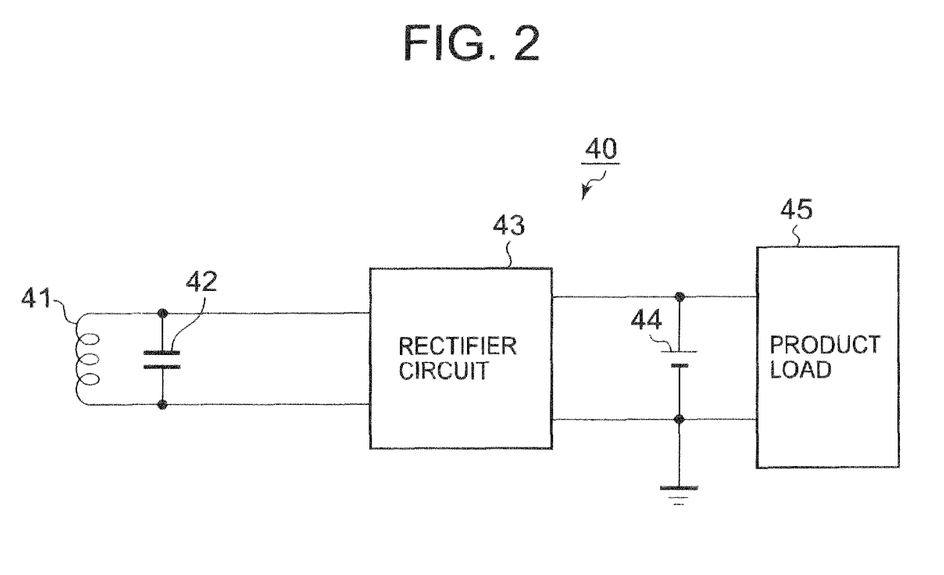
FIG. 2 is a block diagram showing an exemplary circuit configuration of a power receiving device.

FIG. 1 is a block diagram showing a circuit configuration of a power transmission device according to an embodiment of the present invention. FIG. 2 is a block diagram showing an exemplary circuit configuration of a power receiving device.

A power transmission device 1 of this embodiment transmits power in a wireless manner using an electromagnetic induction method to a power receiving device 40. As shown in FIG. 1, the power transmission device 1 includes a power transmission coil 11 that performs power transmission using an electromagnetic induction method, a resonant capacitor 12 that is connected in series to the power transmission coil 11, a drive circuit 13 as a driving unit that drives the power transmission coil 11, a clock divider circuit 14 and an oscillator 15 that supply a control signal for periodic driving the drive circuit 13, a level control circuit 16 that changes an output level of the drive circuit 13, a phase comparison circuit 17 that compares an output phase of the drive circuit 13 with a phase of a resonant operation for phase compensation, a voltage measurement and current measurement circuit 18 as a signal detection unit that detects an electric current flowing in the power transmission coil 11 and a voltage across both ends of the power transmission coil 11, a control circuit 20 as a control unit that performs overall control of the device, and a memory 21 that stores control data or control programs and provides a working memory area to the control circuit 20.

As shown in FIG. 2, the power receiving device 40 includes, for example, a power receiving coil 41 that performs reception of transmitted electrical power, a resonant capacitor 42 connected to the power receiving coil 41, a rectifier circuit 43 that rectifies a voltage that is generated in the power receiving coil 41, a secondary battery 44 that stores electric power that is received and supplies the electric power to a load, and a load circuit 45 that implements a function of the device.

The above described power transmission coil 11 is a device that, when the power receiving coil 41 of the power receiving device 40 is brought adjacent to the power transmission coil 11, electromagnetically couples with the power receiving coil 41 and transmits electric power to the power receiving coil 41 due to an alternating current.

The drive circuit 13 is a circuit which receives a periodic pulse signal from the clock divider circuit 14, and outputs a pulsed driving voltage (hereinafter, referred to as "driving pulse") that is synchronized with the pulse signal. The amplitude of the driving pulse is determined according to the output of the level control circuit 16.

Although the voltage measurement and current measurement circuit 18 is not particularly limited, for example, the voltage measurement and current measurement circuit 18 measures a current that flows in the power transmission coil 11 by differentiating a voltage of the resonant capacitor 12. Further, the voltage measurement and current measurement circuit 18 measures a voltage across the power transmission coil 11 by deriving the respective voltages at both terminals of the power transmission coil and obtaining a difference therebetween. A configuration may also be adopted that detects a current flowing in the power transmission coil 11 using a current detecting resistor.

The control circuit 20 is capable of controlling the amplitude of a driving pulse that is output from the drive circuit 13 by increasing or decreasing an output voltage of the level control circuit 16 by changing a control signal to the level control circuit 16.

Further, by changing a control voltage to the oscillator 15, the control circuit 20 changes the oscillation frequency of the oscillator 15 in accordance with the control voltage. Furthermore, the frequency of the driving pulse output from the drive circuit 13 can be controlled by dividing the oscillation signal at the clock divider circuit 14 and outputting the resulting signal.

A CPU (central processing unit) is mounted in the control circuit 20. The CPU is configured to implement control programs (power transmission main processing shown in FIG. 6 and the like) stored in the memory 21.

The rectifier circuit 43 of the power receiving device 40 is provided with, for example, a rectifier diode that performs full-wave rectification or half-wave rectification. The rectifier diode, for example, has a turn-on voltage Vf (forward voltage) of about 0.6 V, and has characteristics such that the rectifier diode feeds an electric current when a voltage that is higher than the turn-on voltage Vf is applied thereto. Accordingly, the rectifier circuit 43 similarly has characteristics such that the rectifier circuit 43 feeds an electric current when an input voltage exceeds a turn-on voltage (if a plurality of rectifier diodes are serially connected on a current path, the voltage in question is the sum of the turn-on voltage of the rectifier diode×the number of diodes) of the rectifier diode that is a constituent element thereof, and does not feed an electric current at an input voltage that is lower than the turn-on voltage.

Although various configurations are possible for the load circuit 45, for example, a configuration is adopted in which a voltage point at which circuit operation is started is previously decided. When a supply voltage is less than that previously decided voltage the circuit operation is in a stopped state and there is little current consumption. In contrast, when the supply voltage becomes equal to or greater than the previously decided voltage point, circuit operation is started and current is consumed.

Next, the operation of the power transmission device 1 configured as described above will be described.

Figure 3:
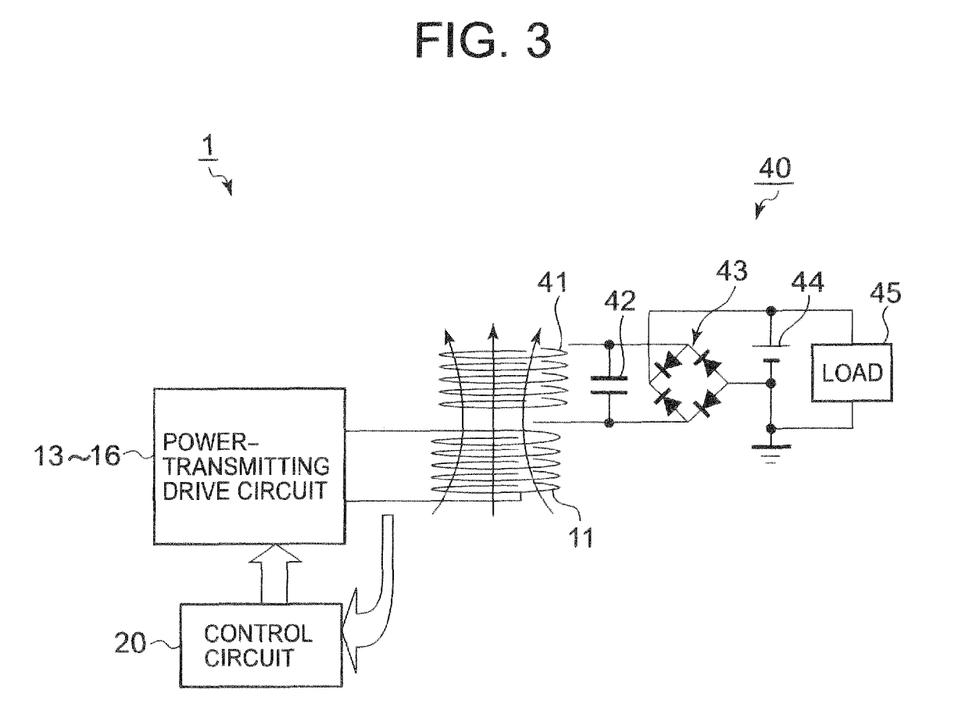
FIG. 3 is an explanatory view illustrating operations when the power receiving device is set in the power transmission device and a load on the power-receiving side is detected.

FIG. 3 is an explanatory view that illustrates operations when the power receiving device 40 is set in the power transmission device 1 and a load on the power-receiving side is detected.

The power transmission device 1 of this embodiment is configured such that processing to confirm whether or not the power receiving device 40 has been set in the power transmission device 1 is performed as the need arises at predetermined time intervals before shifting to a power transmission execution state by control of the control circuit 20.

As shown in the explanatory view of FIG. 3, processing to confirm that the power receiving device 40 has been set in the power transmission device 1 is performed by measuring a current flowing in the power transmission coil 11 while varying the amplitude of a driving pulse that drives the power transmission coil 11, and also detecting a characteristic point representing that an electric current starts to flow in the rectifier circuit 43 on the power-receiving side based on a characteristic line of "driving pulse amplitude" with respect to "coil current amplitude" that is obtained by the aforementioned processing.

Figure 4:
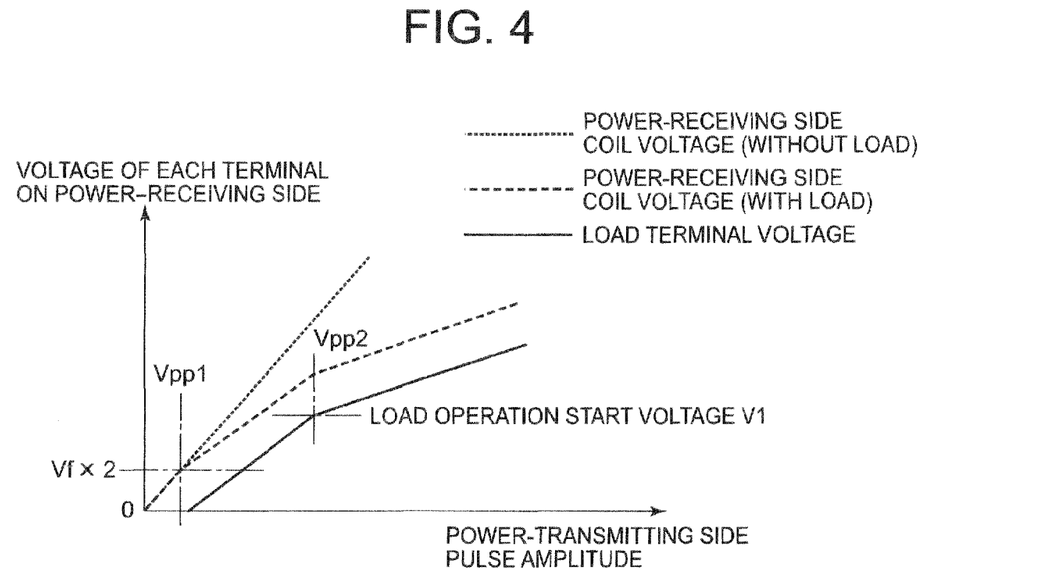
FIG. 4 is a characteristics graph that represents changes in the respective terminal voltages on a power-receiving side with respect to changes in pulse amplitude on a power-transmitting side.

FIG. 4 is a characteristics graph which shows changes in the respective terminal voltages of the power receiving device with respect to amplitude changes in the driving pulse of the power transmission coil 11.

As shown in FIG. 4, as the amplitude of the driving pulse on the power transmitting side is increased, an amplitude of a coil voltage (voltage between both terminals of the power receiving coil 41) of the power receiving coil 41 that is electromagnetically coupled with the power transmission coil 11 also increases. In this case, the power receiving coil 41 is simply provided on the power-receiving side, and in a case in which a load is not connected to the power receiving coil 41, the voltage amplitude of the power receiving coil 41 increases in proportion to the size of the amplitude of the driving pulse on the power transmitting side, as indicated by the finely dotted line (in which the distance between the dots is extremely small) in FIG. 4.

In contrast, when the rectifier circuit 43 or the load circuit 45 is connected to the power receiving coil, since a current does not flow to a stage subsequent to the rectifier circuit 43 until a turn-on voltage Vf of the rectifier diode (in the case of full-wave rectification, since a current is fed to two rectifier diodes, the turn-on voltage of two rectifier diodes "Vf×2") of the rectifier circuit 43 is exceeded, as shown by a line with medium-sized dots in FIG. 4, first, a voltage amplitude of the power receiving coil 41 increases at a gradient that is the same as the gradient when there is no load.

Subsequently, when the size of the driving pulse on the power transmitting side exceeds an amplitude Vpp1 and the voltage amplitude of the power receiving coil 41 exceeds the turn-on voltage "Vfx2" of the rectifier circuit 43, a current flows to the rectifier circuit 43 and the gradient of the voltage amplitude of the power receiving coil 41 becomes small and changes discontinuously.

In this case, as shown by the solid line in FIG. 4, a load terminal voltage that is applied to the load circuit 45 is a voltage value for which the turn-on voltage "Vfx2" of the rectifier circuit 43 has been reduced from the coil voltage of the power receiving coil 41. Further, if the configuration is one in which operations are started and current consumed when the load circuit 45 has exceeded a predetermined voltage, as shown by the solid line in FIG. 4, when the size of the driving pulse on the power transmitting side exceeds the amplitude Vpp2 and the load terminal voltage becomes greater than an operation start voltage V1, a current starts to flow the load circuit 45. Accordingly, in this case, the gradient of the load terminal voltage also becomes small and changes discontinuously.

Since a coil voltage and a load terminal voltage of the power receiving coil 41 are values that differ by the amount of a drop in voltage of the rectifier circuit 43, as shown by the line with medium-sized dots in FIG. 4, a change in the gradient of the load terminal voltage caused by the start of operation of the load circuit 45 as described above also appears in a likewise manner in the characteristic line of the coil voltage of the power receiving coil 41.

The action of the secondary battery 44 of the power receiving device 40 is excluded from the characteristic line of the respective terminal voltages on the power receiving side shown in FIG. 4. For example, in a case in which a battery voltage is being output from the secondary battery 44, when the output voltage of the rectifier circuit 43 exceeds the battery voltage, a charging current flows to the secondary battery 44. Hence, the turn-on voltage of the rectifier circuit 43 becomes a value that is higher by the amount of the battery voltage of the secondary battery 44. However, even in this case, since a current flowing to the rectifier circuit 43 changes from zero to a finite value in the vicinity of a point where the turn-on voltage is exceeded, as shown by the line with medium-sized dots in FIG. 4, a bending point occurs on the characteristic lines in the vicinity of the turn-on voltage.

Figure 5:
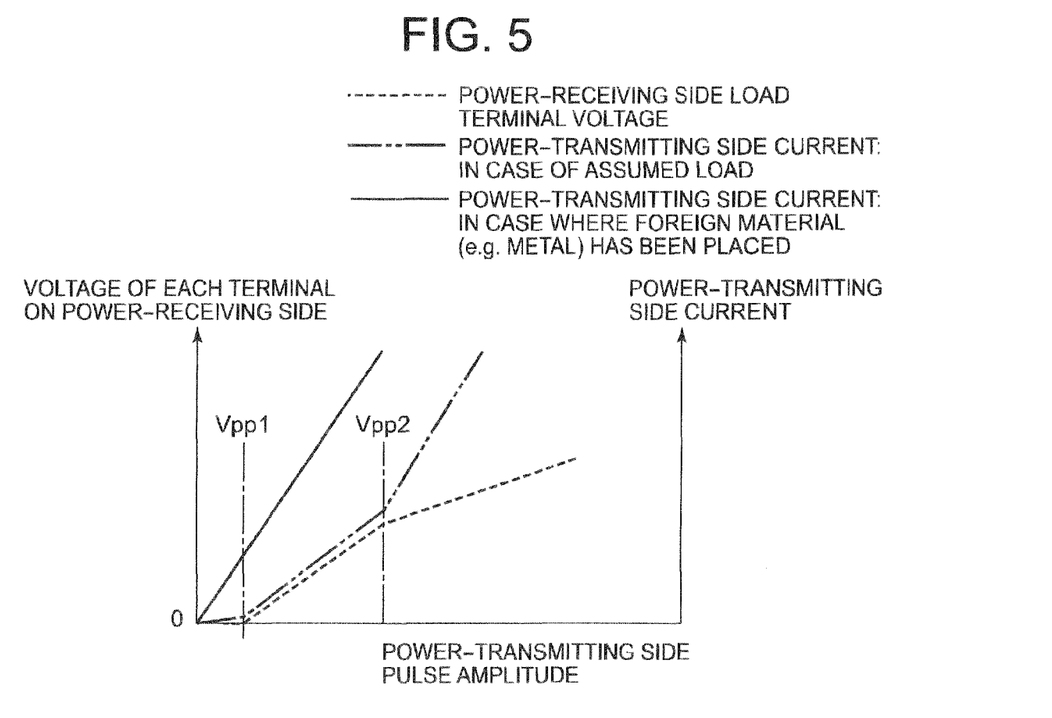
FIG. 5 is a characteristics graph that represents amplitude changes in a load terminal voltage on a power-receiving side and in a coil current on a power transmitting side with respect to changes in pulse amplitude on the power-transmitting side.

FIG. 5 is a characteristics graph that shows amplitude changes in a load terminal voltage on a power-receiving side and in a coil current on a power transmitting side with respect to changes in pulse amplitude on the power-transmitting side.

As is also shown in FIG. 4, a characteristic line for the load terminal voltage on the power-receiving side (dotted line in FIG. 5) exhibits characteristics such that, when the driving pulse of the power transmission coil 11 exceeds an amplitude Vpp1, the gradient of the characteristic line discontinuously changes and a voltage increases roughly in proportion to the pulse amplitude on the power-transmitting side from a zero voltage value. Further, when the driving pulse of the power transmission coil 11 exceeds an amplitude Vpp2, a current flows to the load circuit 45 on the power-receiving side, and as a result, the gradient of the characteristic line becomes small and changes discontinuously.

Although a resonant operation is performed at the power transmission coil 11 through cooperation with the resonant capacitor 12 by the driving pulse being output, in a case in which the power receiving device 40 has been set in the power transmission device 1, a resonant operation is performed with a circuit that also includes the power receiving coil 41 and the resonant capacitor 42 on the power-receiving side by electromagnetic coupling between the power transmission coil 11 and the power receiving coil 41.

In this case, when a current does not flow to the load side from the power receiving coil 41, the current amplitude of the power transmission coil 11 decreases in accordance with the driving pulse. In contrast, when a current flows to the load side from the power receiving coil 41, the current amplitude of the power transmission coil 11 increases in accordance with the driving pulse by the amount of the electric power.

Accordingly, as shown by the chain double-dashed line in FIG. 5, when the power receiving device 40 has been set in the power transmission device 1, the gradient of a characteristic line that expresses changes in the current amplitude of the power transmission coil 11 changes discontinuously in the vicinity of the pulse amplitude Vpp1 at which a current starts to flow to the rectifier circuit 43. Further, in the vicinity of the pulse amplitude Vpp2 at which the load circuit 45 starts to operate and at which there is a further increase in current consumption, the gradient of the aforementioned characteristic line changes discontinuously once again.

The size of a current flowing to the rectifier circuit 43 on the power-receiving side is represented by the gradient or an absolute value of the characteristic line between amplitudes Vpp1 and Vpp2 in FIG. 5. The size of a current flowing to the load circuit 45 on the power-receiving side is represented by the gradient or an absolute value of the characteristic line in a range beyond the amplitude Vpp2 in FIG. 5.

In contrast, when there is a metallic foreign material or the like in the power transmission device 1, an eddy current of a size that is in accordance with the driving pulse is generated at the metallic foreign material accompanying output of a driving pulse to the power transmission coil 11. Accordingly, as shown by the solid line in FIG. 5, a characteristic line of the current amplitude of the power transmission coil 11 exhibits characteristics in which the current amplitude also increases in proportion to the amplitude of the driving pulse.

The control circuit 20 of the power transmission device 1 analyzes a characteristic line (chain double-dashed line or solid line of FIG. 5) that represents the current amplitude of the power transmission coil 11 as described above, and determines the presence or absence of a characteristic point representing that an electric current starts to flow to the rectifier circuit 43 or the load circuit 45 on the power-receiving side. Thereby, the control circuit 20 determines whether or not the power receiving device 40 is set in the power transmission device 1, or whether there is a metallic foreign material or the like in the power transmission device 1.

The configuration is such that the size of a load on the power-receiving side may also be determined based on the amount of a gradient or an absolute value of the characteristic line (chain double-dashed line in FIG. 5) of the current amplitude.

According to this determination processing, control is performed to execute power transmission when it is determined that a target power receiving device has been set in the power transmission device 1. Conversely, when the existence of a metallic foreign material is determined or when it is determined that a device other than a target device that has a different sized load or the like is set in the power transmission device 1, control is performed to stop power transmission or the like.

Next, control operations of the control circuit 20 that implements the above described processing will be described in detail based on the flowcharts of FIG. 6 and FIG. 7.

Figure 6:
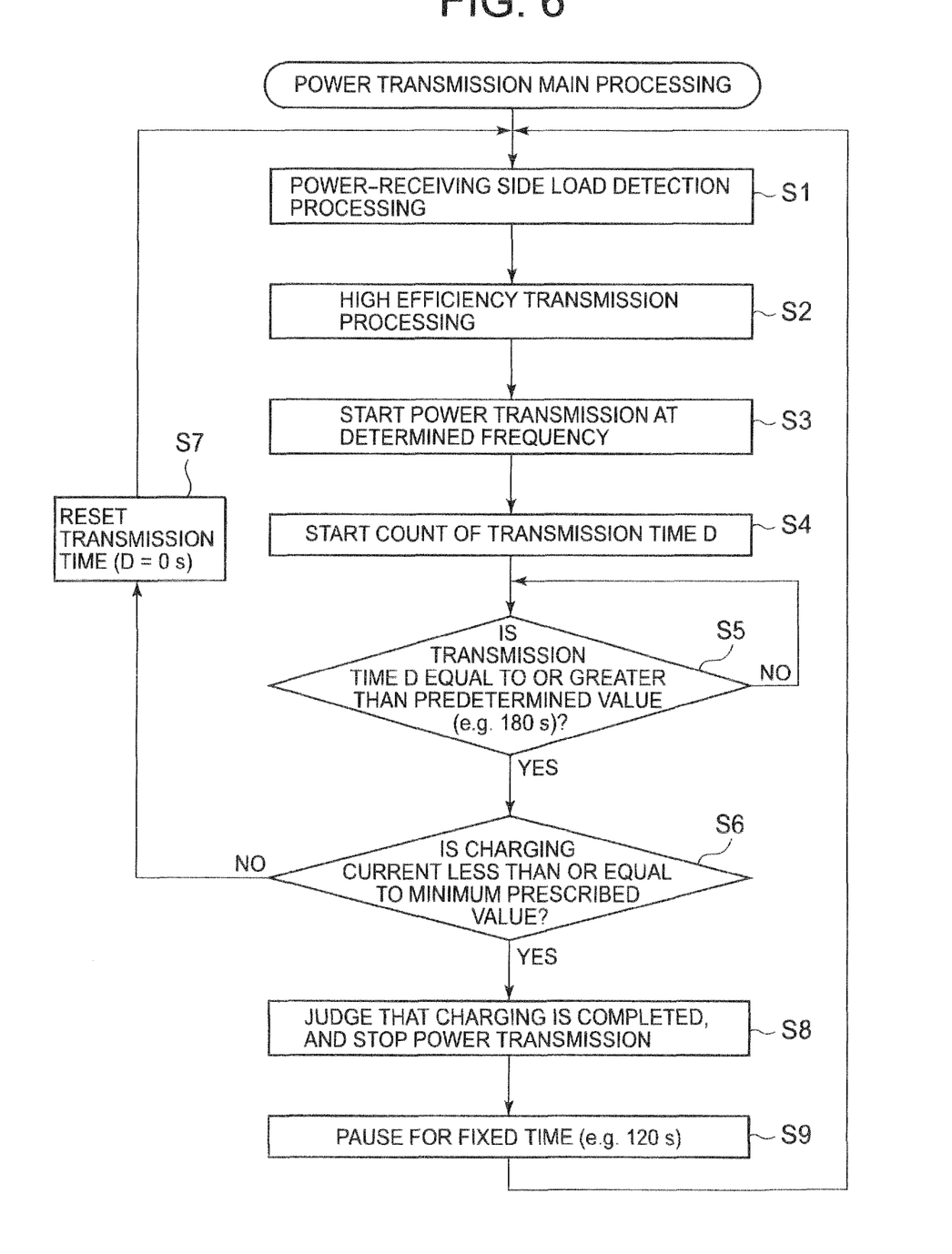
FIG. 6 is a flowchart illustrating power transmission main processing executed by a control circuit.

FIG. 6 is a flowchart that illustrates procedures of power transmission main processing executed by the control circuit 20.

The power transmission main processing shown in FIG. 6 starts when the power is turned on, and is continuously executed by the control circuit 20. When the power transmission main processing starts, first, step S1, the control circuit 20 executes power-receiving side load detection processing that detects whether or not the power receiving device 40 is set in the power transmission device 1. When nothing has been placed in the vicinity of the power transmission coil 11 of the power transmission device 1, a detection loop is repeatedly executed within the power-receiving side load detection processing. When it is detected that a power receiving device that is a target for power transmission has been placed in the vicinity thereof, the control circuit 20 exits the power-receiving side load detection processing to move to step S2.

The processing from step S2 is performed as appropriate in order to transmit power to the power receiving device 40. More specifically, at step S2, processing is performed to suitably adjust the frequency of the driving pulse of the power transmission coil 11 so that power transmission is performed at a high transmitting efficiency to the power receiving device 40. When a frequency that realizes a high transmitting efficiency is determined, next, in step S3, the power transmission coil 11 is driven with a driving pulse of the relevant frequency to start the transmission of power.

Subsequently, in order to confirm whether the prescribed power transmitting is completed for each transmitting time unit (for example, 180 seconds), first, in step S4, the control circuit 20 starts a count of a transmitting time D, and in step S5 the control circuit 20 stands by until the transmitting time D passes a unit time (for example, 180 seconds). When the unit time has elapsed, next, in step S6, the control circuit 20 measures a charging current of the power receiving device 40 based on the amplitude of the driving pulse of the power transmission coil 11 or the current amplitude of the coil current, and determines whether or not the charging current is less than a minimum prescribed value.

When the control circuit 20 determines that the charging current has become less than the minimum prescribed value, the control circuit 20 judges that the secondary battery 44 of the power receiving device 40 is fully charged, and then stops the power transmission operation (step S8). Thereafter, the control circuit 20 pauses for a fixed time (for example, 120 seconds) (step S9), and then returns to step S1 again.

In contrast, if it is determined in the determination processing in step S6 that the charging current is not less than the minimum prescribed value, the control circuit 20 judges that the secondary battery 44 has not yet reached a full charge. Consequently, the control circuit 20 resets the count value of the transmitting time D (step S7), and thereafter returns to step S1.

Figure 7:
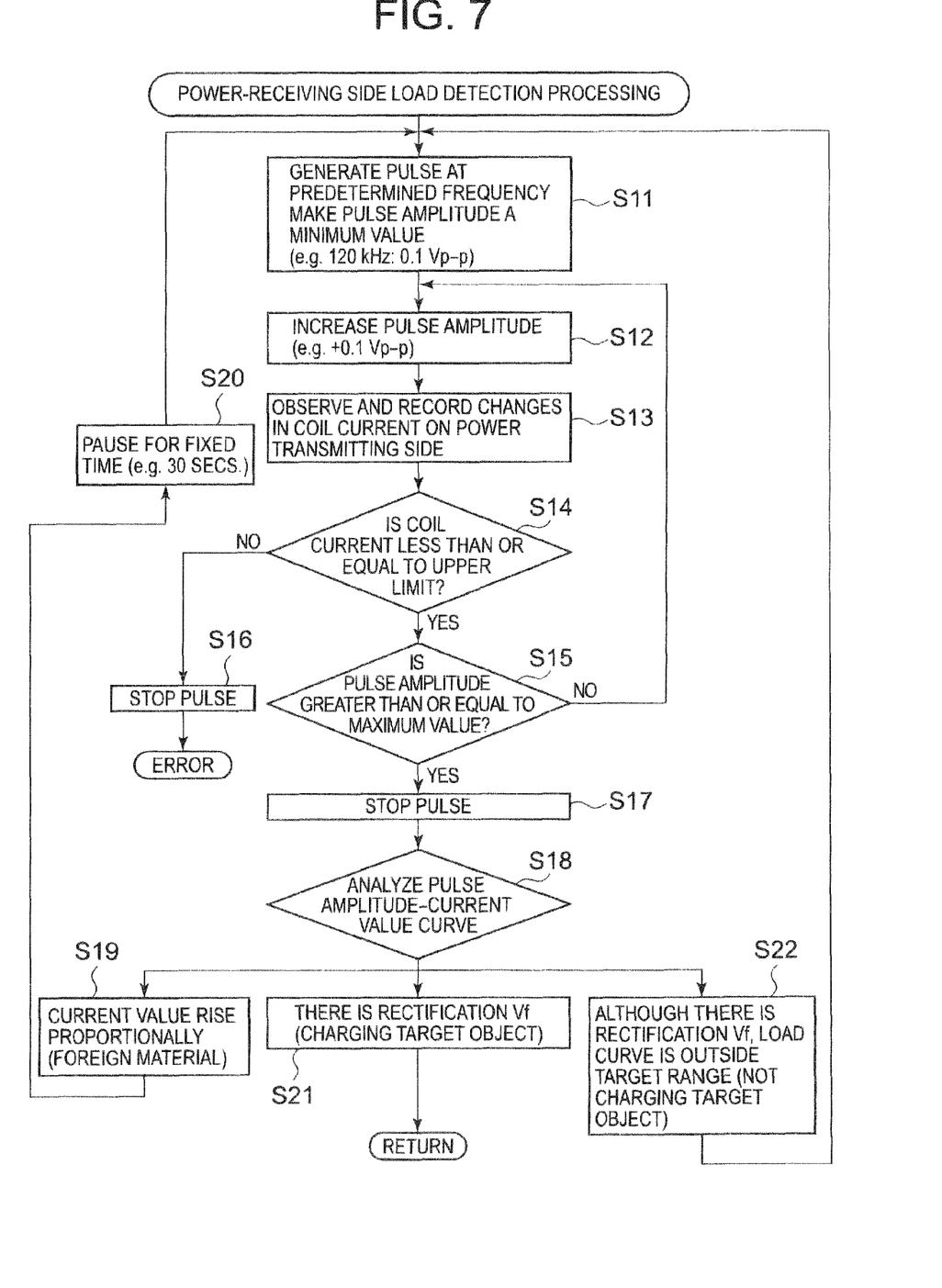
FIG. 7 is a flowchart illustrating power-receiving side load detection processing shown in step S1 of the power transmission main processing.

FIG. 7 illustrates a flowchart of power-receiving side load detection processing that is executed in step S1 of the power transmission main processing.

Upon moving to the power-receiving side load detection processing, first, in step S11, the control circuit 20 performs output of a driving pulse at a predetermined frequency such that the pulse amplitude becomes a minimum value. Subsequently, in step S12, the control circuit 20 gradually increases the amplitude of the driving pulse. Next, in step S13, the control circuit 20 captures the output of the voltage measurement and current measurement circuit 18 and observes and records changes in the coil current of the power transmission coil 11. Specifically, in this case, the control circuit 20 records the current amplitude of the coil current.

After acquiring the value of the coil current, first, in step S14, the control circuit 20 checks whether the coil current exceeds an upper limit value. If the coil current does not exceed the upper limit value, next, in step S15, the control circuit 20 checks whether the pulse amplitude has reached a maximum value. If the pulse amplitude has not reached the maximum value, the control circuit 20 returns to step S12 and repeats the loop processing of steps S12 to S15.

By performing the loop processing of steps S12 to S15, the control circuit 20 acquires current amplitude values of the power transmission coil 11 when the amplitude of the driving pulse is gradually increased from the minimum value. As a result, the characteristic line of the current amplitude of the power transmission coil 11 shown in FIG. 5 can be obtained.

When it is determined in the determination processing in step S14 that the coil current exceeds the upper limit value, for example, in step S16, the control circuit 20 stops output of the driving pulse and causes an error termination of the control processing. In this case, control process by the control circuit 20 is stopped and, for example, the control processing resumes once more when a reset operation is performed or the power is turned on again.

During the loop processing of steps S12 to S15 described above, if it is determined in the determination processing in step S15 that the amplitude of the driving pulse has reached a maximum value, the control circuit 20 firstly stops an output of the driving pulse (step S17). Next, in step S18, the control circuit 20 performs analytic processing of a characteristic line of "driving pulse amplitude" with respect to "current amplitude of coil current" that is acquired with the above described loop processing. A configuration that includes operation a starting point detection unit is realized by the control circuit 20 that executes the analytic processing of step S18.

If the analytic processing result is a characteristic line in which the electric current amplitude proportionally rises, as shown by the solid line in FIG. 5, it is determined that a metallic foreign material has been placed in the power transmission device 1 (step S19). Thereafter, the control circuit 20 pauses for a fixed time (for example, 30 seconds) (step S20), and then returns again to step S11.

Further, as shown by the chain double-dashed line in FIG. 5, when there is a bend indicating that an electric current starts to flow to the rectifier circuit 43 on the characteristic line, and a gradient or an absolute value of the characteristic line that represents a size of the load is within a predetermined range, the control circuit 20 determines that the object in question is a normal target object for power transmission (step S21). In this case, the control circuit 20 exits the power-receiving side load detection processing to move to step S2 that is the next step in the power transmission main processing (FIG. 6).

The control circuit 20 that executes the processing of the above described steps S19, S20, and S21 constitutes a transmission stopping control unit.

In contrast, if a gradient or an absolute value of the characteristic line that represents a size of the load is not within a predetermined range even though there is a bend indicating that an electric current starts to flow to the rectifier circuit 43 on the characteristic line, the control circuit 20 determines that the device is not an object for which power transmission is to be performed (step S22). In this case, the control circuit 20 returns again to step S11 and repeats the processing for checking the power receiving device.

According to this power-receiving side load detection processing, a judgment as to whether the target power receiving device 40 is set in the power transmission device 1 or whether a metallic foreign material or the like has been placed therein can be carried out by only control operations of the power transmission device 1, without performing communication or the like with the power receiving device.

As described above, according to the power transmission device 1 of this embodiment, the above described power-receiving side load detection processing makes it possible to determine whether the target power receiving device 40 has been set in the power transmission device 1, whether a device that is not a target object for power transmission has been set therein, or whether a metallic foreign material or the like has been placed therein only by control operations on the power transmission device 1 side.

By pausing a power transmission operation for a fixed time when it is determined that a metallic foreign material or the like has been placed in the power transmission device 1, it is possible to prevent heating of the metallic foreign material. Further, by commencing a power transmission operation when it is determined that a device that is a target object for power transmission has been placed in the power transmission device 1, transmission of power to the target device can be performed.

Further, by analyzing a gradient amount or an absolute value from a characteristic line acquired by the power-receiving side load detection processing, it is possible to determine whether the size of a load on the power-receiving side is within a target range or is outside a target range. Hence, it is possible to perform power transmission to only a device that is within a target range, and to eliminate power transmission operations to a device that is outside a target range.

Accordingly, a single power transmission device 1 can be applied to a system that performs power transmission with respect to a plurality of kinds of arbitrary power receiving devices, and it is also possible to select a receiving side device to which power transmission is possible and perform the power transmission.

Further, since the configuration of the above embodiment is one that acquires a characteristic line for "amplitude of a driving pulse output to the power transmission coil 11" with respect to "current amplitude of the coil current" by the power-receiving side load detection processing, the control of a driving pulse or detection of a signal that is necessary to acquire the characteristic line can be performed relatively easily. It is also possible to detect a characteristic point representing that an electric current starts to flow in the power receiving device 40 as a bend (discontinuous change in gradient) on the characteristic line relatively easily by analytic processing. It is thereby possible to exactly distinguish between a metallic foreign material and the power receiving device 40.

Further, because the presence of the power receiving device 40 is confirmed by detecting a characteristic point representing that an electric current starts to flow to the rectifier circuit 43, the confirmation of the presence of the power receiving device 40 can be performed without driving the power transmission coil 11 to a large extent.

The present invention is not limited to the above described embodiment, and various changes may be made without departing from the scope of the invention. For example, in order to drive a power transmission coil, a sine wave driving voltage may be output instead of outputting the pulsed driving voltage from the drive circuit.

Further, according to the above described embodiment, a coil current is detected while changing a voltage amplitude of a driving pulse. In order to drive a power transmission coil, a sine wave driving current may be output while changing a current amplitude. In this case, a configuration that detects a voltage between terminals of a power transmission coil may be employed as a signal detection unit. Further, a characteristic line for "drive current amplitude" with respect to "coil voltage amplitude" is acquired thereby, and confirmation of the presence of a power receiving device can also be similarly carried out based on the characteristic line.

In addition, as a signal that is detected in order to check for a power receiving device, it is possible to apply not only a signal for a voltage or a current of a power transmission coil, but also, for example, a phase difference between a driving signal of a power transmission coil and a resonant operation of the power transmission coil. When a current starts to flow in a circuit on the power-receiving side, an abrupt change also occurs in the aforementioned phase difference accompanying the start of the current flow. Hence, it is sufficient to adopt a configuration that detects this change point as a characteristic point representing that an electric current starts to flow in a circuit on the power-receiving side.

Further, although a method has been described above that acquires amplitude values of a coil current while gradually increasing the amplitude of a driving pulse from a minimum value in order to acquire the above described characteristic line, a method may also be adopted that acquires amplitude values of a coil current while decreasing the amplitude of a driving pulse from a maximum value. Furthermore, a method may be adopted that acquires amplitude values of a coil current while randomly changing the amplitude of a driving pulse instead of gradually changing the amplitude, and after the amplitude values are acquired, sorts the data to obtain the above described characteristic line. Moreover, it is to be understood that the specific circuit configurations and control methods described in the embodiment can be appropriately changed within a range that does not depart from the spirit and scope of the invention.

Although various exemplary embodiments have been shown and described, the invention is not limited to the embodiments shown. Therefore, the scope of the invention is intended to be limited solely by the scope of the claims that follow.

What is claimed is:

1. A power transmission device, comprising:
    a power transmission coil which transmits electric power to a power receiving coil by an electromagnetic induction method;
    a driving unit which supplies a driving voltage to the power transmission coil;
    a detection unit which detects an amplitude of an electric current flowing in the power transmission coil based on the driving voltage supplied by the driving unit;
    a control unit which changes an amplitude of the driving voltage supplied by the driving unit;
    a characteristic determining unit which determines whether the amplitude of the electric current detected by the detection unit is increased at a constant rate when the control unit gradually increases the amplitude of the driving voltage supplied to the power transmission coil from a minimum value; and
    a transmission stopping control unit which stops power transmission by the power transmission coil if the characteristic determining unit determines that the amplitude of the electric current is increased at a constant rate.

* * * * *